(12) United States Patent
Katsuda et al.

(10) Patent No.: US 8,941,846 B2
(45) Date of Patent: Jan. 27, 2015

(54) COPY MACHINE AND NON-TRANSITORY COMPUTER READABLE RECORDING MEDIUM STORED WITH CONTROL PROGRAM FOR COPY MACHINE

(75) Inventors: Takeo Katsuda, Tokyo (JP); Shinya Miyake, Hino (JP)

(73) Assignee: Konica Minolta, Inc., Tokyo (JP)

( * ) Notice: Subject to any disclaimer, the term of this patent is extended or adjusted under 35 U.S.C. 154(b) by 207 days.

(21) Appl. No.: 13/495,622

(22) Filed: Jun. 13, 2012

(65) Prior Publication Data

US 2012/0320398 A1 Dec. 20, 2012

(30) Foreign Application Priority Data

Jun. 17, 2011 (JP) ................................. 2011-135344

(51) Int. Cl.
*G06F 3/12* (2006.01)
*G03G 15/00* (2006.01)
(52) U.S. Cl.
CPC ...... *G03G 15/60* (2013.01); *G03G 2215/00177* (2013.01)
USPC ....................................................... 358/1.13
(58) Field of Classification Search
CPC .................... G03G 15/60; G03G 2215/00177
USPC ..................... 399/371, 82; 358/1.13
See application file for complete search history.

(56) References Cited

U.S. PATENT DOCUMENTS

| 5,550,623 | A | 8/1996 | Tomita | |
|---|---|---|---|---|
| 2005/0100358 | A1* | 5/2005 | Ushio et al. | 399/82 |
| 2005/0111894 | A1* | 5/2005 | Hosoi | 399/371 |

FOREIGN PATENT DOCUMENTS

| CN | 1128363 | 8/1996 |
|---|---|---|
| JP | 8-65443 | 3/1996 |
| JP | 9-18690 | 1/1997 |
| JP | 9-312735 | 12/1997 |
| JP | 2001-322326 | 11/2001 |
| JP | 2006-128794 | 5/2006 |
| JP | 2009-200548 | 9/2009 |

OTHER PUBLICATIONS

Official Notice of Reason for Refusal dated Aug. 20, 2013 in Japanese Patent Application No. 2011-135344.
Chinese Office Action, Application or Patent No. 201210194032.0. Issuing No. 2014061200877650. Issuing Date: Jun. 17, 2014 (9 pages).
English translation of Chinese Office Action, Application or Patent No. 201210194032.0. Issuing No. 2014061200877650. Issuing Date: Jun. 17, 2014 (12 pages).
Japanese Office Action, Decision of Refusal, Patent Application No. 2011-135344. Dispatch Date: Mar. 4, 2014, with English translation thereof.

* cited by examiner

*Primary Examiner* — Tammy Pham
*Assistant Examiner* — Bharatkumar Shah
(74) *Attorney, Agent, or Firm* — Lucas & Mercanti, LLP

(57) ABSTRACT

The copy machine selects either of a first direction in which a long-side direction of the paper matches the writing sub-scan direction and a second direction in which a short-side direction of the paper matches the writing sub-scan direction, with considering, when the paper is fed in the first direction, the number of documents, the number of copies, the time required for a reading process, the time required for an image forming process, and the time the reading process and the image forming process overlap, and with considering, when the paper is fed in the second direction, the number of documents, the number of copies, the time required for the reading process, the time required for a rotation process, and the time required for an image forming process.

21 Claims, 10 Drawing Sheets

COPY MACHINE AND NON-TRANSITORY COMPUTER READABLE RECORDING MEDIUM STORED WITH CONTROL PROGRAM FOR COPY MACHINE

CROSS-REFERENCE TO RELATED APPLICATION

This application is based on Japanese Patent Application No. 2011-135344 filed on Jun. 17, 2011, the contents of which are incorporated herein by reference.

BACKGROUND

1. Technical Field

The present invention relates to a copy machine that reads an image of a document and makes a copy of the document, and a non-transitory computer readable recording medium that is stored with a control program for the copy machine.

2. Description of Related Art

In recent years, multifunction devices (Multi-Function Peripheral: MFP) having the functions of a copier, printer, image scanner, facsimile and so on, are gaining popularity. An MFP is provided with an automatic document transport device (Auto Document Feeder: ADF) that feeds a document to an image reading unit for reading an image of the document, and can read a plurality of documents in a row.

When copying processes of a document are performed by an MFP having an ADF, normally, the document is set in the ADF such that the short-side direction of the document matches the transport direction of the document, and the document is fed from the ADF to an image reading unit by LEF (Long Edge Feed). An image of the document fed by LEF is read by a line sensor that is provided to extend in a direction orthogonal to the transport direction of the document, where the long-side direction of the document is in line with the reading main scan direction and the short-side direction of the document is in line with the reading sub-scan direction. Then, an image, which is based on image data acquired by the line sensor by reading the image of the document, is formed on a sheet of paper that is fed from a paper feed tray to an image forming unit by LEF. The image forming unit has an optical unit that is formed with a laser oscillator, a polygon mirror and so on, and forms an image on the sheet of paper fed by LEF, such that the long-side direction of the sheet is in line with the writing main scan direction and the short-side direction is in line with the writing sub-scan direction.

According to this configuration, the time required for the reading process of the document becomes short compared to a case where a document is fed from an ADF by SEF (Short Edge Feed) and an image of the document is read such that the long-side direction of the document is in line with the reading sub-scan direction. Also, the time required for the image forming process on paper becomes short compared to a case where paper is fed from a paper feed tray to an image forming unit by SEF and an image is formed such that the long-side direction of paper is in line with the writing sub-scan direction. In addition, since the orientation of image data acquired by reading a document and the orientation of paper match, it is not necessary to rotate the orientation of image data through 90 degrees, and the time required for copying processes can be minimized.

However, there are ADFs that can set a document only in the orientation of SEF and that can feed a document to an image reading unit only by SEF. Also, even if an ADF is able to set a document in either direction of LEF/SEF, depending on the users, cases might occur where a document is set in the direction of SEF and the document is fed to an image reading unit by SEF.

In the event a document is fed by SEF and an image of the document is read such that the long-side direction of the document is in line with the reading sub-scan direction, feeding paper by SEF may make it unnecessary to rotate image data and consequently make the time required for copying processes short, or feeding paper by LEF may make the time required for the image forming process short and consequently make the time required for copying processes short. Consequently, in the event a document is fed by SEF and an image of the document is read such that the long-side direction of the document is in line with the reading sub-scan direction, it is preferable to appropriately switch the feeding direction of paper on which an image is going to be formed and shorten the time required for copying processes.

Note that Unexamined Japanese Patent Publication No. H09-018690 discloses a technology for, in copying processes of a document, feeding paper in an orientation that matches the orientation of a document from a paper feed tray, and forming an image. However, although according to this technology it is not necessary to rotate image data, when a document is fed by SEF, the time required for copying processes does not always become short.

Also, Unexamined Japanese Patent Publication No. 2001-322326 discloses a technology for, in a printing process of forming an image based on print data on paper, selecting the paper feeding direction to give the shorter printing time, by considering the difference in the time required for an image forming process on paper that is fed by LEF/SEF, and the time required for the process of rotating image data. However, this technology is specific to a printing process and does not take into account reading of an image of a document by an image reading unit.

SUMMARY

The present invention is made in view of the above problems. It is therefore an object of the present invention to provide a copy machine and a non-transitory computer readable recording medium that is stored with a control program for the copy machine that can reduce the time required for copying processes, in copying processes of reading an image of a document such that the long-side direction of the document is in line with the reading sub-scan direction and the short-side direction is in line with the reading main scan direction and making a copy of the document.

To achieve at least one of the above-mentioned objects, a copy machine reflecting one aspect of the present invention includes: a reading unit that reads an image of a document such that a long-side direction of the document is in line with a reading sub-scan direction and a short-side direction is in line with a reading main scan direction; a rotation unit that rotates image data acquired by reading the image of the document by the reading unit; an image forming unit that forms the image on paper based on image data acquired by reading the image of the document by the reading unit or based on the image data rotated by the rotation unit, such that a transport direction of the paper is in line with a writing sub-scan direction and a direction orthogonal to the writing sub-scan direction is in line with a writing main scan direction; a selection unit that selects either of a first direction in which a long-side direction of the paper matches the writing sub-scan direction and a second direction in which a short-side direction of the paper matches the writing sub-scan direction, that makes the time required after a reading process of the document is started until an image forming process is complete shorter, with considering, when the paper is fed to the image forming unit in the first direction, the number of documents, the number of copies, the time required for a reading process of the document, the time required for an image forming process on the paper that is fed in the first direction, and the time the reading process and the image forming process overlap, and with considering, when the paper is fed to the image forming unit in the second direction, the number of documents, the number of copies, the time required for the reading process, the time required for a rotation process of the image data, and the time required for an image forming process on the paper that is fed in the second direction; and a control unit that performs control to make the image forming unit perform the image forming process, without making the rotation unit perform the rotation process, when the first direction is selected by the selection unit, and to make the rotation unit perform the rotation process and then make the image forming unit perform the image forming process when the second direction is selected by the selection unit.

The above copy machine preferably further has a reduction unit that reduces the image data; the selection unit preferably selects either of the first and second directions with further considering the time required for a reduction process of the image data and, when the reduction process is performed, after the reading process for one document is complete, the control unit preferably performs control to make the reduction unit perform the reduction process with respect to the document.

The above copy machine preferably further has an enlargement unit that enlarges the image data; the selection unit preferably selects either of the first and second directions with further considering the time required for an enlargement process of the image data; and, when the enlargement process is performed, the control unit preferably performs control to make the reading unit read part of the image of the document, and, after the reading process of the part of the image is complete, make the enlargement unit perform the enlargement process.

In the above copy machine, the reading unit is preferably configured to be able to select first mode to perform the reading process at first reading speed and second mode to perform the reading process of higher resolution than the first mode at second reading speed that is slower than the first reading speed, and the time required for the reading process preferably varies when the first mode is selected and when the second mode is selected.

In the above copy machine, the time required for the reading process of one document by the reading unit is preferably longer than the time required for the image forming process with respect to the one document by the image forming unit.

The objects, features, and characteristics of this invention other than those set forth above will become apparent from the description given herein below with reference to preferred embodiments illustrated in the accompanying drawings.

DETAILED DESCRIPTION

The embodiments of this invention will be described below with reference to the accompanying drawings.

Figure 1:
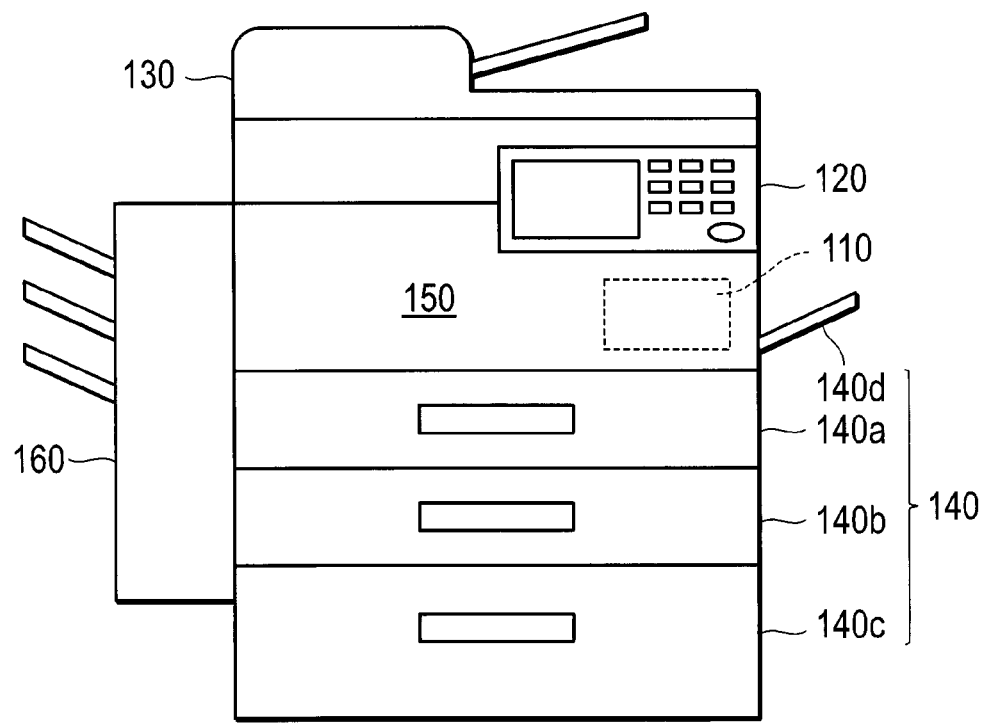
FIG. 1 is a schematic front view showing a structure of an MFP according to an embodiment of the present invention.
Figure 2:
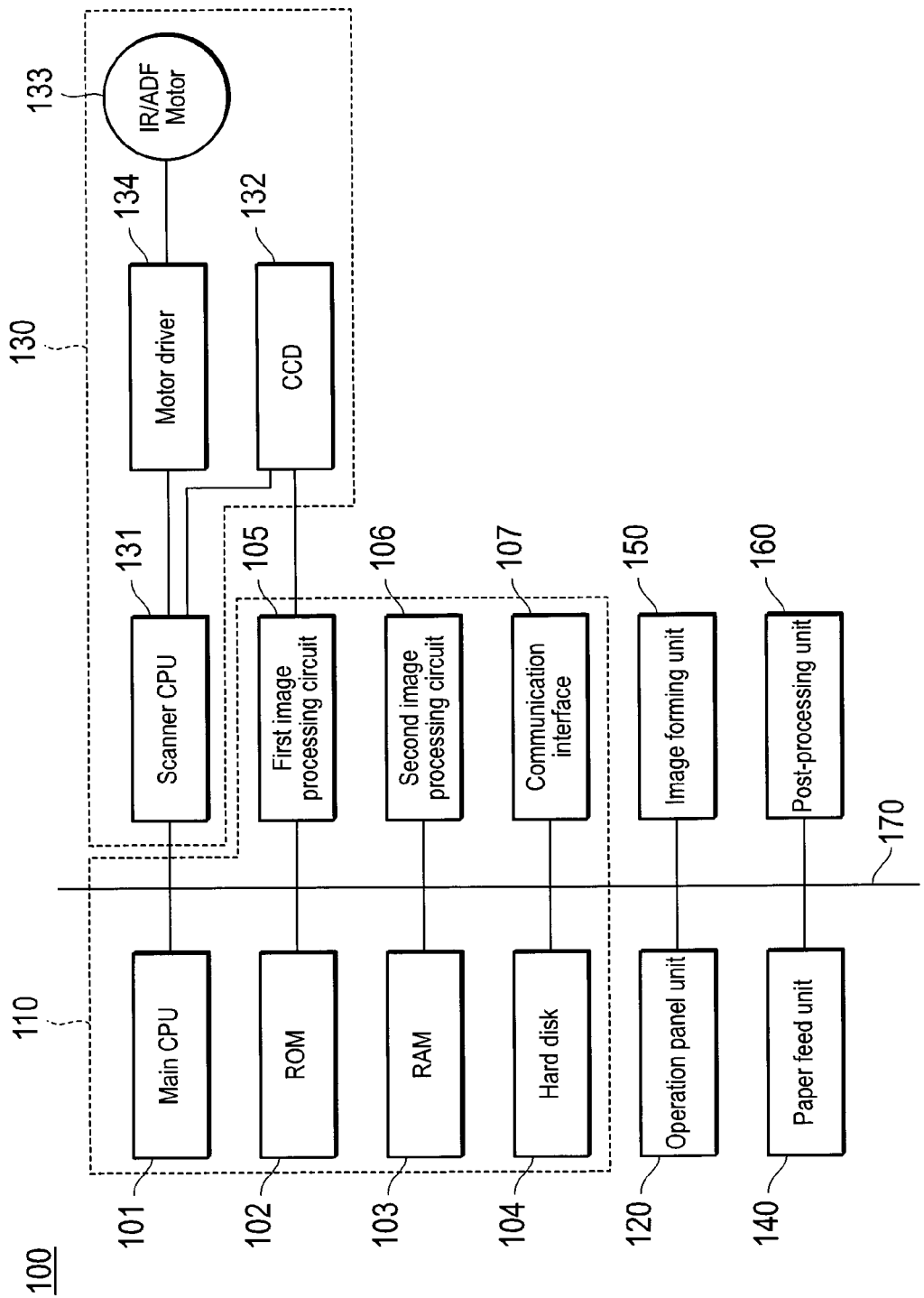
FIG. 2 is a block diagram showing a structure of the MFP illustrated in FIG. 1.

FIG. 1 is a schematic front view showing a structure of an MFP according to an embodiment of the present invention, and FIG. 2 is a block diagram showing a structure of the MFP illustrated in FIG. 1.

An MFP 100, which serves as a copy machine, has a control unit 110, an operation panel unit 120, an image reading unit 130, a paper feed unit 140, an image forming unit 150, and a post-processing unit 160, and these are connected mutually via a bus 170 to exchange signals.

The control unit 110 has a main CPU (Central Processing Unit) 101, a ROM (Read Only Memory) 102, a RAM (Random Access Memory) 103, a hard disk 104, a first image processing circuit 105, a second image processing circuit 106 and a communication interface 107.

The main CPU 101 controls the above various parts and performs various calculation processes according to programs. The ROM 102 stores various programs and various data. The RAM 103 serves as a work space by storing programs and data on a temporary basis.

The hard disk 104 stores various programs and various data to control the basic operations of the MFP 100. Also, the hard disk 104 stores a program for selecting the orientation (LEF/SEF) of paper to be fed from the paper feed unit 140 to the image forming unit 150, upon execution of copying processes by the MFP 100.

The first image processing circuit 105 performs image processing on image data acquired by reading an image of a document by the image reading unit 130. The first image processing circuit 105 performs image processing for enlarging or reducing the image data. The second image processing circuit 106 performs image processing on image data that is generated when a job is executed, and transfers the image data after the image processing to the image forming unit 150. The second image processing circuit 106 performs a rotation process of rotating the orientation of image data through 90 degrees, according to the orientation of paper fed from the paper feed unit 140.

The communication interface 107 is an interface for communicating with other devices, and includes a network interface and a USB (Universal Serial Bus) interface. The network interface is an interface for communicating with other devices via a network, and adopts a standard such as Ethernet, Token-Ring, and FDDI (Fiber Distributed Data Interface). The USB interface is an interface that can connect and disconnect devices that comply with the USB standard, such as USB memories and so on, to the MFP 100 in a state the MFP 100 is powered on.

The operation panel unit 120 has elements such as a touch panel, ten-keys, a start button and a stop button, and is used to display various information and input various commands.

The image reading unit 130 has a scanner CPU 131, a CCD (Charge Coupled Devices) image sensor 132, an IR/ADF motor 133, and a motor driver 134. The scanner CPU 131 controls the above various parts and performs various calculation processes according to programs. The IR/ADF motor 133 is a motor to drive the image reading device (Image Reader: IR) and ADF, and the motor driver 134 controls the IR/ADF motor 133. A document can be set in the ADF of the present embodiment only in the orientation in which the long-side direction of the document and the transport direction of the document match. The image reading unit 130 illuminates a document that is set in a predetermined reading position on a document tray, or a document that is transported by an ADF to the predetermined reading position, by a light source such as a fluorescent lamp, performs an opto-electronic conversion of the reflected light by a CCD imaging sensor 132, and generates image data from the electrical signal. The CCD image sensor 132 is a line sensor in which a predetermined number of reading pixels extend in the direction (reading main scan direction) orthogonal to the document transport direction. Also, the image reading unit 130 of the present embodiment is configured to be able to select between high quality mode to read an image of a document at high resolution and low quality mode to read an image of a document at low resolution.

The paper feed unit 140 stocks paper on which an image is formed. The paper feed unit 140 has a plurality of paper feed trays 140a to 140c and a manual feed tray 140d, and sends out the paper stocked in the paper feed trays 140a to 140c and manual feed tray 140d one sheet at a time to the image forming unit 150. The plurality of paper feed trays 140a to 140c stock paper of different sizes and different orientations. In the present embodiment, in the first paper feed tray 140a, A4 size paper is stocked vertically so that paper is fed to the image forming unit 150 by SEF. On the other hand, in the second paper feed tray 140b, A4 size paper is stocked horizontally so that paper is fed to the image forming unit 150 by LEF.

The image forming unit 150 forms an image on paper based on image data transferred from the second image processing circuit 106, using known imaging processes such as electronic photographic processes and so on. The image forming unit 150 has an optical unit (not illustrated) formed with a laser oscillator, a polygon mirror, a photosensitive body and so on, and forms an electrostatic latent image on the photosensitive body, by scanning a laser beam emitted from the laser oscillator by the polygon mirror in the writing main scan direction. A toner image, which is acquired by supplying toner to the electrostatic latent image, is transferred on paper that is transported in the writing sub-scan direction of the laser beam (the rotation direction of the photosensitive body).

The post-processing unit 160 discharges paper on which an image has been formed by the image forming unit 150. The post-processing unit 160 has a plurality of paper discharge trays, and paper on which an image is formed is discharged to a predetermined paper discharge tray. Also, the post-processing unit 160 is provided with post-processing devices (not illustrated) for applying post-processing including a stapling process, a punching process and so on.

Note that the MFP 100 may include components other than the above components or may not include part of the above components.

With the MFP 100 of the present embodiment configured as described above, when copying processes of a document are executed, the orientation of paper on which an image is going to be formed is switched depending on the content of the copying processes, in order to reduce the time required for the copying processes. Now, the operations of the MFP 100 will be described below with reference to FIG. 3 to FIG. 12.

Figure 3:
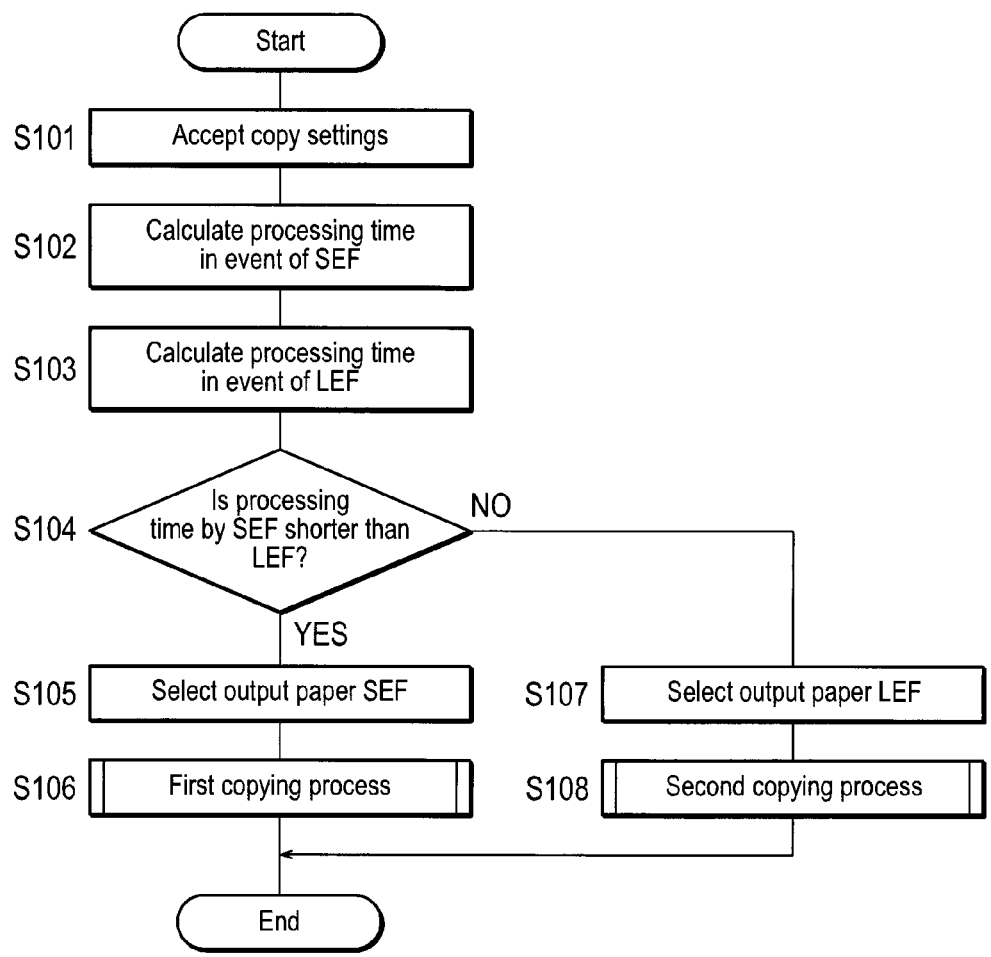
FIG. 3 is a flowchart illustrating the steps of a copying process executed by an MFP.

FIG. 3 is a flowchart illustrating the steps of a copying process executed by the MFP. Note that the algorithms illustrated in the flowchart of FIG. 3 are stored in the hard disk 104 of the MFP 100 in the form of a program and implemented by the main CPU 101. Prior to execution of copying processes, a document is set in the ADF such that the document is fed to the image reading unit 130 by SEF and an image of the document is read such that the long-side direction of the document is in line with the reading sub-scan direction.

First, the copy settings are accepted (step S101). In the present embodiment, the copy settings set up by the user are accepted. The copy settings include the image quality setting, the setting as to the number of copies and the enlargement/reduction setting. Also, in the present embodiment, the number of documents is input by the user, and the number of documents is accepted. Note that, unlike the present embodiment, the number of documents may be determined by detecting the weight and thickness of documents, and be set automatically.

Next, the time required for copying processes in the event paper is fed by SEF is calculated (step S102). In the present embodiment, upon executing copying processes of reading an image of a document that is fed by SEF and forming an image on paper that is fed by SEF, the time required after the reading process is started until the image forming process is complete, is calculated. To be specific, the time required for copying processes is calculated considering the number of documents, the number of copies, the time required for the image forming process on paper fed by SEF, the reading speed corresponding to the image quality setting (that is to say, the time required for the reading process) and the content of the enlargement/reduction process. To be more specific, in the event of copying processes at 1× magnification, the time required for the copying processes is calculated based on the number of documents, the number of copies, the time required for the image forming process, the time required for the reading process, and the time the reading process and the image forming process for the same document overlap. Also, in the event of copying processes involving enlargement/reduction, the time required for the copying processes is calculated based on the number of documents, the number of copies, the time required for the image forming process, the time required for the reading process and the time required for the enlargement/reduction process.

Next, the time required for copying processes in the event paper is fed by LEF is calculated (step S103). In the present embodiment, upon executing copying processes of reading an image of a document that is fed by SEF and forming an image on paper that is fed by LEF, the time required after the reading process is started until the image forming process is complete, is calculated. To be more specific, the time required for copying processes is calculated considering the number of documents, the number of copies, the time required for the image forming process on paper that is fed by LEF, the time required for the reading process, the content of the enlargement/reduction process, and the time required for the rotation process of image data. To be more specific, in the event of copying processes at 1×magnification, the time required for the copying processes is calculated based on the number of documents, the number of copies, the time required for the image forming process, the time required for the reading process and the time required for the rotation process. Also, in the event of copying processes involving enlargement/reduction, the time required for the copying processes is calculated based on the number of documents, the number of copies, the time required for the image forming process, the time required for the reading process, the time required for the rotation process, and the time required for the enlargement/reduction process.

Next, whether or not the time required for copying processes when paper is fed by SEF is shorter than the time required when paper is fed by LEF is determined (step S104). In the present embodiment, the time calculated in the process illustrated in step S102 and the time calculated in the process illustrated in step S103 are compared, and whether or not the time required for copying processes when paper is fed by SEF is shorter than the time required for copying processes when paper is fed by LEF, is determined.

When the time required for copying processes when paper is fed by SEF is determined to be shorter than the time required when paper is fed by LEF (step S104: YES), SEF is selected (step S105). In the present embodiment, it is determined that the time required for copying processes becomes shorter by feeding paper by SEF and performing an image forming process than by feeding paper by LEF and performing an image forming process, and therefore SEF is selected.

Then, a first copying process is executed (step S106), and the process is finished. In the present embodiment, the first copying process of performing an image forming process on paper that is fed by SEF, is executed. The first copying process illustrated in step S106 will be described later in detail.

On the other hand, in the process illustrated in step S104, when the time required for copying processes when paper is fed by SEF is determined to be longer than the time required when paper is fed by LEF (step S104: NO), LEF is selected (step S107). In the present embodiment, it is determined that the time required for copying processes becomes shorter by feeding paper by LEF and performing an image forming process than by feeding paper by SEF and performing an image forming process, and therefore LEF is selected.

Then, a second copying process is executed (step S108), and the process is finished. In the present embodiment, the second copying process of performing an image forming process on paper that is fed by LEF, is executed. The second copying process illustrated in step S108 will be described later in detail.

As described above, according to the processes in the flowchart illustrated in FIG. 3, between SEF and LEF, the feeding direction of the one that makes the time required for copying processes shorter is selected based on the content of copying processes, and copying processes in accordance with this selection result are executed.

Figure 4:
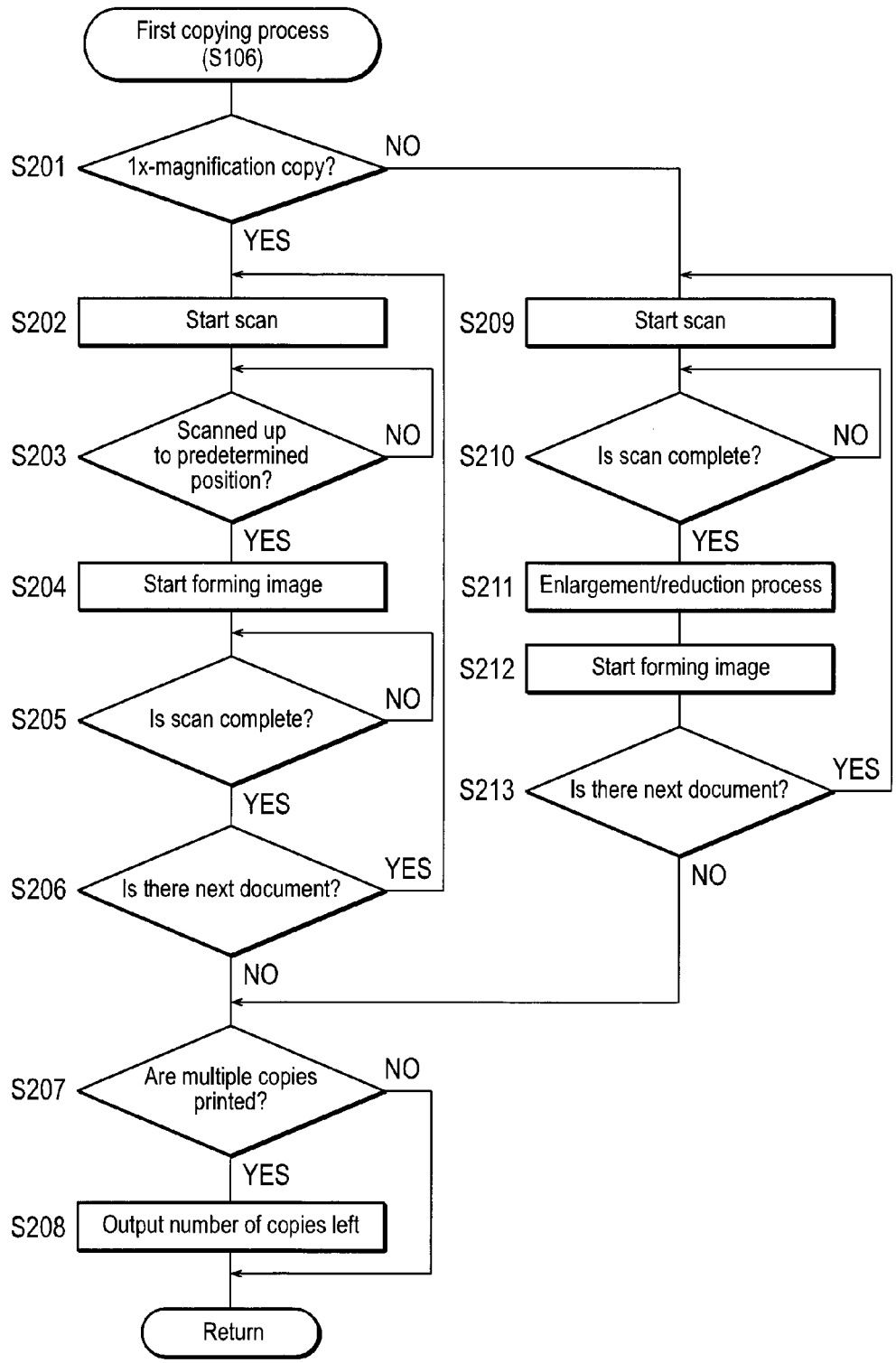
FIG. 4 is a flowchart illustrating the steps of the first copying process shown in step S106 in FIG. 3.

FIG. 4 is a flowchart illustrating the steps of the first copying process illustrated in step S106 in FIG. 3. In the first copying process, an image of a document fed by SEF is read, and an image is formed on paper that is fed by SEF.

First, whether or not 1×-magnification copying is performed is determined (step S201). In the present embodiment, based on the copy settings accepted in the process illustrated in step S101 of FIG. 3, whether the copying processes involve reduced or enlarging copying, or 1×-magnification copying, is determined.

When it is determined that 1×-magnification copying is not performed (step S201: NO), the step moves on to the process of step S209. On the other hand, when it is determined that 1×-magnification copying is performed (step S201: YES), a reading process of the document is started (step S202). In the present embodiment, for a document that is fed by SEF, the image reading unit 130 starts reading an image such that the long-side direction of the document is in line with the reading sub-scan direction.

Next, whether or not the document has been read up to a predetermined position is determined (step S203). In the present embodiment, with respect to the document which has been started being read in the process illustrated in step S202, whether or not image has been read up to a predetermined position in the long-side direction of the document (reading sub-scan direction) is determined.

When it is determined that the document has not been read up to a predetermined position (step S203: NO), the document is waited to be read up to a predetermined position.

On the other hand, when it is determined that the document has been read up to a predetermined position (step S203: YES), an image forming process is started (step S204). In the present embodiment, an image starts being formed on paper that is fed by SEF based on image data generated following the advancement of reading by the image reading unit 130 in the reading sub-scan direction. On paper that is fed by SEF, an image is formed such that the long-side direction of paper is in line with the writing sub-scan direction.

Next, whether or not the reading process is complete is determined (step 205). In the present embodiment, for the document which was started being read in the process illustrated in step S202, whether or not reading of an image is complete is determined.

In the event the reading process is determined not to be complete (step S205: NO), the reading process is waited to be complete. On the other hand, in the event the reading process is determined to be complete (step S205: YES), whether or not there is a next document is determined (step S206). In the present embodiment, whether or not a document is left in the ADF is determined. Note that image data acquired when the reading process is complete is stored in the RAM 103 for recycle use.

When it is determined that there is a next document (step S206: YES), the step returns to the process of step S202. As a result of this, until the reading process is complete with respect to all documents set in the ADF, the processes of step S202 and onward are repeated.

On the other hand, when it is determined that there is not a next document (step S206: NO), whether or not multiple copies are to be printed is determined (step S207). In the present embodiment, based on the copy settings accepted in the process illustrated in step S101 of FIG. 3, whether or not the number of copies is set two or greater is determined.

When it is determined that multiple copies are to be printed (step S207: YES), the number of copies left is output (step S208). In the present embodiment, based on the image data of the document stored in the RAM 103, image forming is executed for the number of copies left. On the other hand, when it is determined that not multiple copies are to be printed (step S207: NO), the process is finished.

As described above, according to the processes illustrated in steps S201 to S208 in FIG. 4, an image of a document that is fed by SEF is read and meanwhile an image is formed on paper that is fed by SEF. When paper is fed by SEF, the orientation of the image data of the document and the orientation of paper match, so that there is no need to rotate the image data, and the image forming process is started before the reading process of one document is complete. That is to say, in the event copies are printed in 1×-magnification by SEF, the time in which the reading process is executed and the time in which the image forming process is executed for the same document partly overlap, and therefore the time after reading process is started until image forming process is started is short.

On the other hand, in the event 1×-magnification copying is determined not to be performed in the process illustrated in step S201 (step S201: NO), a reading process of the document is started (step S209). In the present embodiment, for a document that is fed by SEF, an image starts being read such that the long-side direction of the document is in line with the reading sub-scan direction.

Next, whether or not the reading process is complete is determined (step 210). In the event the reading process is determined not to be complete (step S210: NO), the reading process is waited to be complete. On the other hand, in the event the reading process is determined to be complete (step S210: YES), an enlargement/reduction process of the image is executed (step S211). In the present embodiment, based on the copy settings, an enlargement or reduction process is applied to the image data acquired by reading the image of the document by the image reading unit 130.

Next, an image forming process is started (step S212). In the present embodiment, based on the image data having been subjected to an enlargement/reduction process in the process illustrated in step S211, an image starts being formed on paper that is fed by SEF. On paper that is fed by SEF, an image is formed such that the long-side direction of paper is in line with the writing sub-scan direction.

Next, whether or not there is a next document is determined (step S213). When it is determined that there is a next document (step S213: YES), the step returns to the process of step S209. On the other hand, when it is determined that there is not a next document (step S213: NO), the number of copies left is output according to the copy settings (steps S207 and S208), and then the process is finished.

As described above, according to the processes illustrated in steps S207 to S213 in FIG. 4, after an image of a document that is fed by SEF is read and an enlargement/reduction process of the image is executed, an image is formed on paper fed by SEF. Note that, when paper is fed by SEF, the orientation of image data of a document and the orientation of paper match, so that there is no need to rotate the image data. However, if an enlargement/reduction process of an image is involved, it is then necessary to apply an enlargement/reduction process to image data of one document acquired when the reading process of the document is complete, so that it is not possible to start the image forming process before the reading process is complete.

Figure 5:
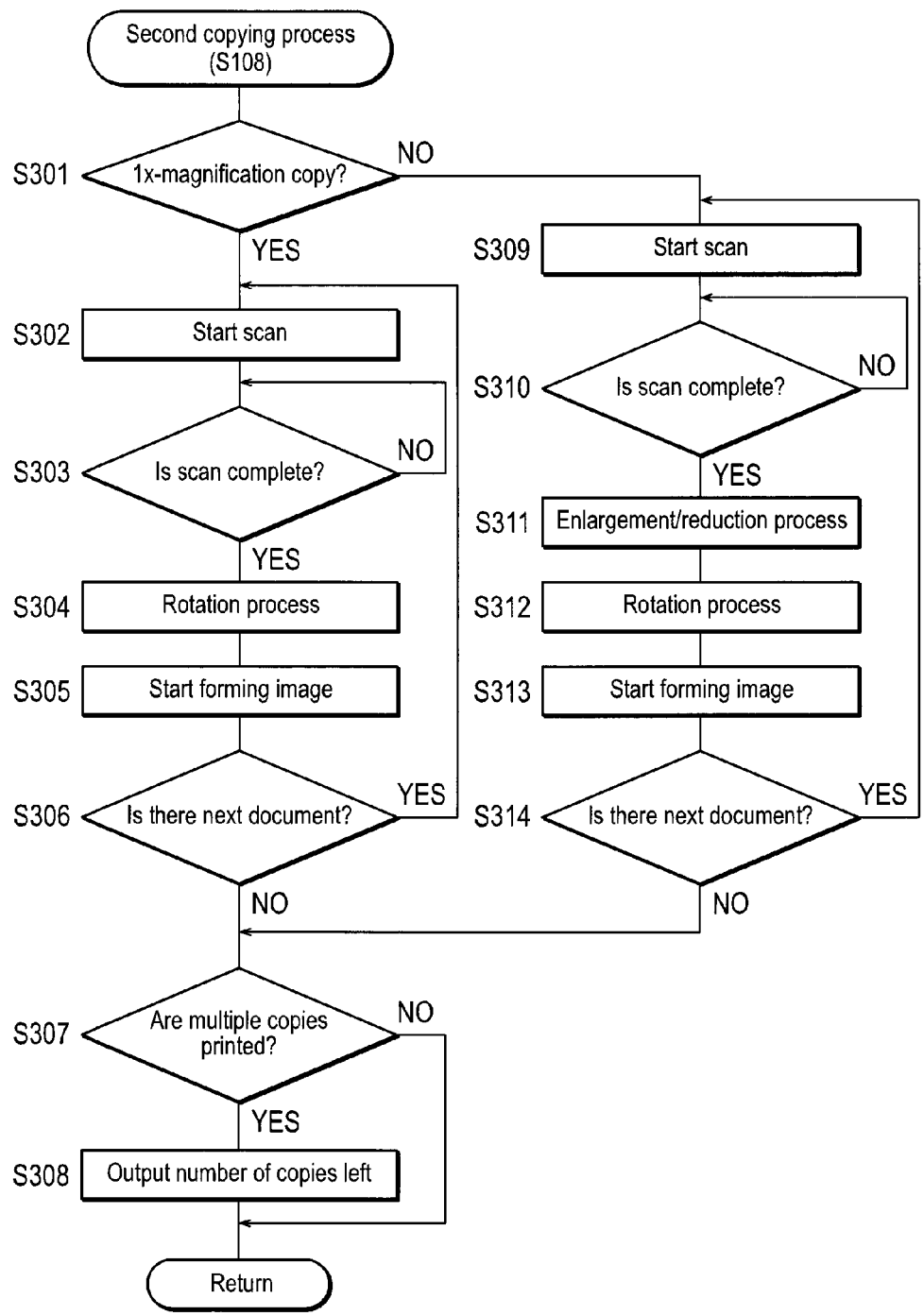
FIG. 5 is a flowchart illustrating the steps of the second copying process shown in step S108 in FIG. 3.

FIG. 5 is a flowchart illustrating the steps of the second copying process illustrated in step S108 in FIG. 3. In the second copying process, an image of a document fed by SEF is read, and an image is formed on paper that is fed by LEF.

First, whether or not 1×-magnification copying is performed is determined (step S301). When it is determined that 1×-magnification copying is not performed (step S301: NO), the step moves on to the process of step S309. On the other hand, when it is determined that 1×-magnification copying is performed (step S301: YES), a reading process of the document is started (step S302). In the present embodiment, for a document that is fed by SEF, an image starts being read such that the long-side direction of the document is in line with the reading sub-scan direction.

Next, whether or not the reading process is complete is determined (step S303). In the event the reading process is determined not to be complete (step S303: NO), the reading process is waited to be complete.

On the other hand, in the event the reading process is determined to be complete (step S303: YES), a rotation process of the image is executed (step S304). In the present embodiment, a rotation process of rotating image data through 90 degrees is applied to the image data acquired by reading the image of the document by the image reading unit 130. As the orientation of image data is rotated through 90 degrees, it becomes possible to form an image based on image data that is acquired by reading an image of a document fed by SEF, on paper that is fed by LEF.

Next, an image forming process is started (step S305). In the present embodiment, an image starts being formed on paper that is fed by LEF, based on the image data rotated in the process illustrated in step S304. On paper that is fed by LEF, an image is formed such that the short-side direction of paper is in line with the writing sub-scan direction.

Next, whether or not there is a next document is determined (step S306). When it is determined that there is a next document (step S306: YES), the step returns to the process of step S302. On the other hand, when it is determined that there is not a next document (step S306: NO), whether or not multiple copies are to be printed is determined (step S307).

When it is determined that multiple copies are to be printed (step S307: YES), the number of copies left is output (step S308). On the other hand, when it is determined that not multiple copies are to be printed (step S307: NO), the process is finished.

As described above, according to the processes illustrated in steps S301 to S308 in FIG. 5, an image of a document fed by SEF is read, and, after a rotation process of the image is executed, an image is formed on paper that is fed by LEF.

On the other hand, in the event 1×-magnification copying is determined not to be performed in the process illustrated in step S301 (step S301: NO), the reading process of the document is started (step S309). In the present embodiment, for a document that is fed by SEF, an image starts being read such that the long-side direction of the document is in line with the reading sub-scan direction.

Next, whether or not the reading process is complete is determined (step 310). In the event the reading process is determined not to be complete (step S310: NO), the reading process is waited to be complete. On the other hand, in the event the reading process is determined to be complete (step S310: YES), an enlargement/reduction process of the image is executed (step S311).

Next, a rotation process of the image is executed (step S312), and an image forming process is started (step S313). In the present embodiment, on paper that is fed by LEF, an image is formed such that the short-side direction of paper is in line with the writing sub-scan direction.

Next, whether or not there is a next document is determined (step S314). When it is determined that there is a next document (step S314: YES), the step returns to the process of step S309. On the other hand, when it is determined that there is not a next document (step S314: NO), the number of copies left is output according to the copy settings (steps S307 and S308), and then the process is finished.

As described above, according to the processes illustrated in steps S307 to S314 in FIG. 5, an image of a document fed by SEF is read, and, after an enlargement/reduction process and rotation process of the image are executed, an image is formed on paper that is fed by LEF.

Next, with reference to FIG. 6 to FIG. 10, the relationship between the time required for copying processes when paper is fed by SEF and the time required for copying processes when paper is fed by LEF will be explained.

FIG. 6 to FIG. 10 are time charts to show the time required for copying processes when paper is fed by SEF and the time required for copying processes when paper is fed by LEF. The horizontal axis in each drawing is the time past from the time copying is started. The upper part in each drawing is the copying processes in the event paper is fed by SEF, and the lower part in each drawing is the copying process in the event paper is fed by LEF. Note that, in the copying processes of the present embodiment, the time required for the image forming process based on image data of one document is shorter than the time required for the reading process of one document. Also, the time required for the reading process changes depending on the reading speed corresponding to image quality mode.

Figure 6:
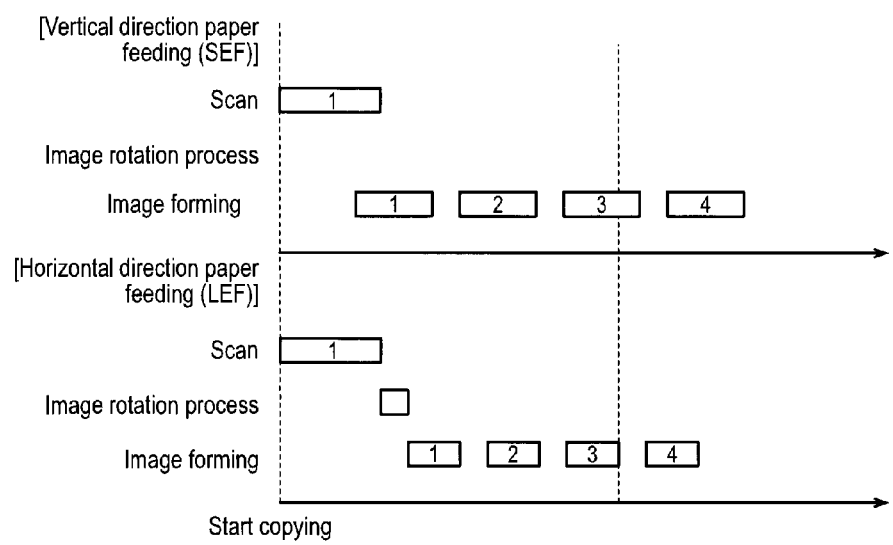
FIG. 6 is a diagram showing the time required for copying processes by SEF and the time required for copying processes by LEF, in the event multiple copies of one document are printed at 1× magnification.

FIG. 6 is a diagram showing the time required for copying processes by SEF and the time required for copying processes by LEF in the event multiple copies of one document are printed at 1× magnification. In either case of SEF or LEF, the document reading process is performed one time, which equals the number of documents, and the image forming process is performed a number of times, which equals the product of the number of documents and the number of copies. Also, as with LEF, the rotation process is performed one time, which equals the number of documents.

As described above, in the copying processes by SEF, there is no need to execute a rotation process of image data, and the image forming process is started before the reading process (scan) of the document by the image reading unit 130 is complete. On the other hand, in the copying processes by LEF, a rotation process of image data has to be executed, so that, after the reading process of the document by the image reading unit 130 is executed, an image rotation process is executed, and then the image forming process is started.

Consequently, as illustrated in FIG. 6, in the event multiple copies of one document are printed, if the number of copies is less than a specific number of copies (in FIG. 6, three copies), the time required for copying processes is shorter with SEF. That is to say, the time calculated in step S102 in FIG. 3 is shorter than the time calculated in step S103. However, since the time required for the image forming process itself is shorter with LEF, if the number of copies equals or exceeds a specific number of copies, the time required for copying processes is shorter with LEF. That is to say, the time calculated in step S103 in FIG. 3 is shorter than the time calculated in step S102.

In the copying processes of the present embodiment, the time required for copying processes by SEF and the time required for copying processes by LEF are both calculated, based on the copy settings. To be more specific, in copying processes by SEF, the time required for the copying processes is calculated considering that the image forming process is started before the reading process is complete, and, in copying processes by LEF, the time required for the copying processes is calculated considering that the rotation process is executed after the reading process is complete, and then the image forming process is started. Then, based on the times calculated, the one feeding direction to make the time for copying processes shorter is selected, and copying processes are executed in the selected feeding direction.

Figure 7:
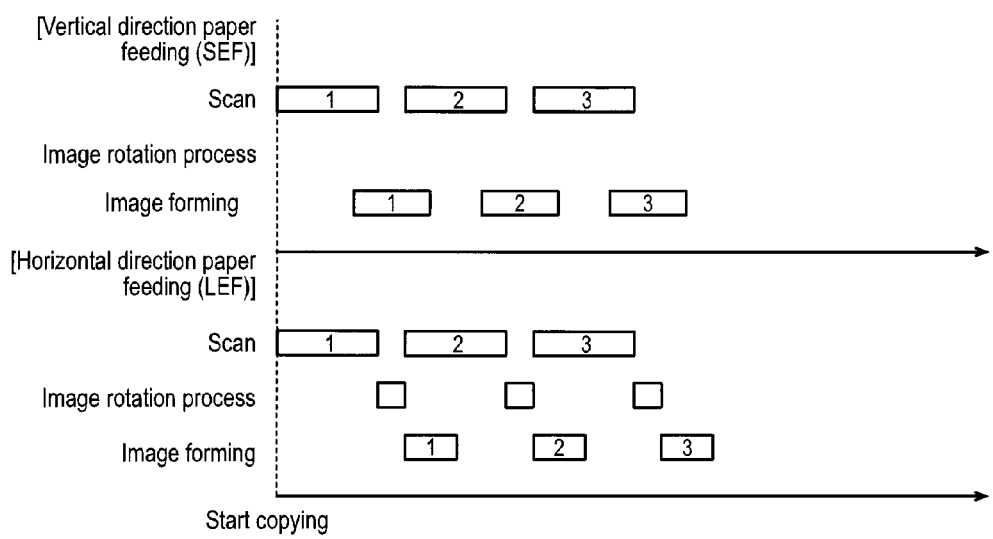
FIG. 7 is a diagram showing the time required for copying processes by SEF and the time required for copying processes by LEF, in the event three documents are printed in one copy each at 1× magnification.
Figure 8:
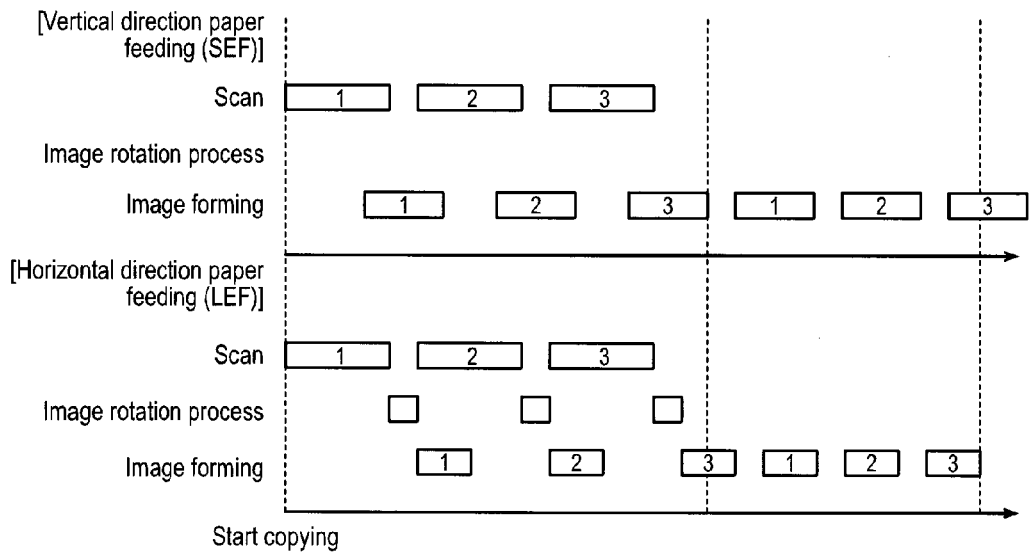
FIG. 8 is a diagram showing the time required for copying processes by SEF and the time required for copying processes by LEF, in the event three documents are printed in multiple copies each at 1× magnification.

FIG. 7 is a diagram showing the time required for copying processes by SEF and the time required for copying processes by LEF in the event three documents are printed in one copy each at 1× magnification, and FIG. 8 is a diagram showing the time required for copying processes by SEF and the time required for copying processes by LEF in the event three documents are printed in multiple copies each at 1× magnification. In either case of SEF or LEF, the document reading process is performed three times, which equals the number of documents, and the image forming process is performed three times, which equals the product of the number of documents and the number of copies. Also, as with LEF, the rotation process is performed three times, which equals the number of documents.

As illustrated in FIG. 7, with the MFP 100 of the present embodiment, if three documents are printed in one copy each at 1× magnification, the time required for copying processes becomes shorter by SEF than by LEF. That is to say, the time calculated in step S102 of FIG. 3 becomes shorter than the time calculated in step S103. Consequently, in the copying processes of the present embodiment, SEF is selected, and the image forming process is performed on paper that is fed by SEF.

On the other hand, as illustrated in FIG. 8, with the MFP 100 of the present embodiment, in the event three documents are printed in multiple copies each at 1× magnification, the time required for copying processes becomes shorter by LEF than by SEF. That is to say, the time calculated in step S103 of FIG. 3 becomes shorter than the time calculated in step S102. Consequently, in the copying processes of the present embodiment, LEF is selected, and the image forming process is performed on paper that is fed by LEF. In either case of SEF or LEF, the document reading process is performed three times, which equals the number of documents, and the image forming process is performed a number of times, which equals the product of the number of documents and the number of copies. Also, as with LEF, the rotation process is performed three times, which equals the number of documents.

Figure 9:
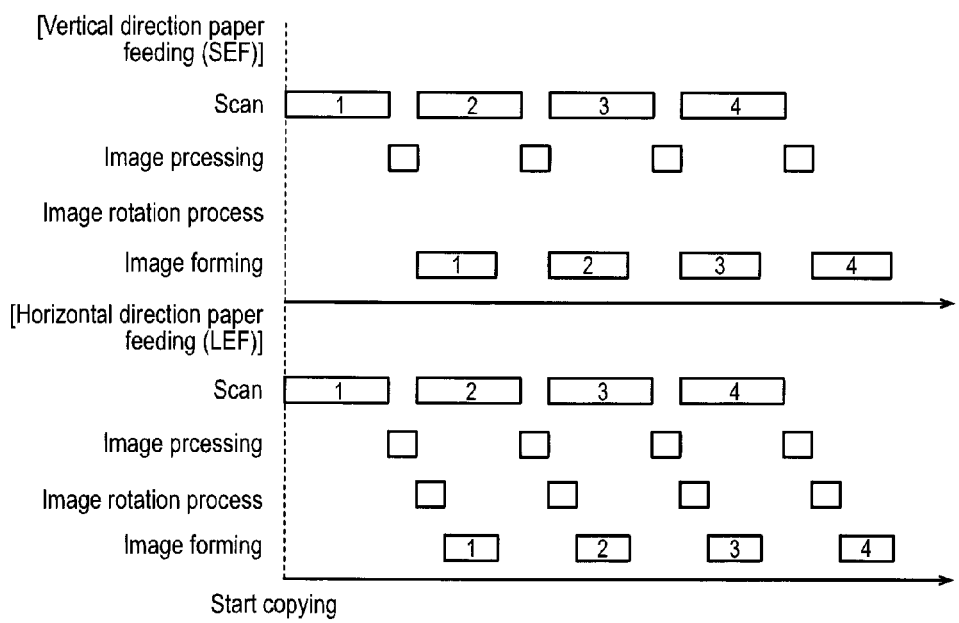
FIG. 9 is a diagram showing the time required for copying processes by SEF and the time required for copying processes by LEF, in the event four documents are printed in one copy each at reduced magnification.

FIG. 9 is a diagram showing the time required for copying processes by SEF and the time required for copying processes by LEF, in the event four documents are printed in one copy each at reduced magnification.

As described above, in the event an image is reduced, it is necessary to apply image processing to image data, and therefore it is not possible to start the image forming process before the document reading process is complete, and, after the document reading process is complete, image processing is executed, and then the image forming process is started. Consequently, as illustrated in FIG. 9, with the MFP 100 of the present embodiment, the time required for copying processes by SEF and the time required for copying processes by LEF become nearly the same.

Figure 10:
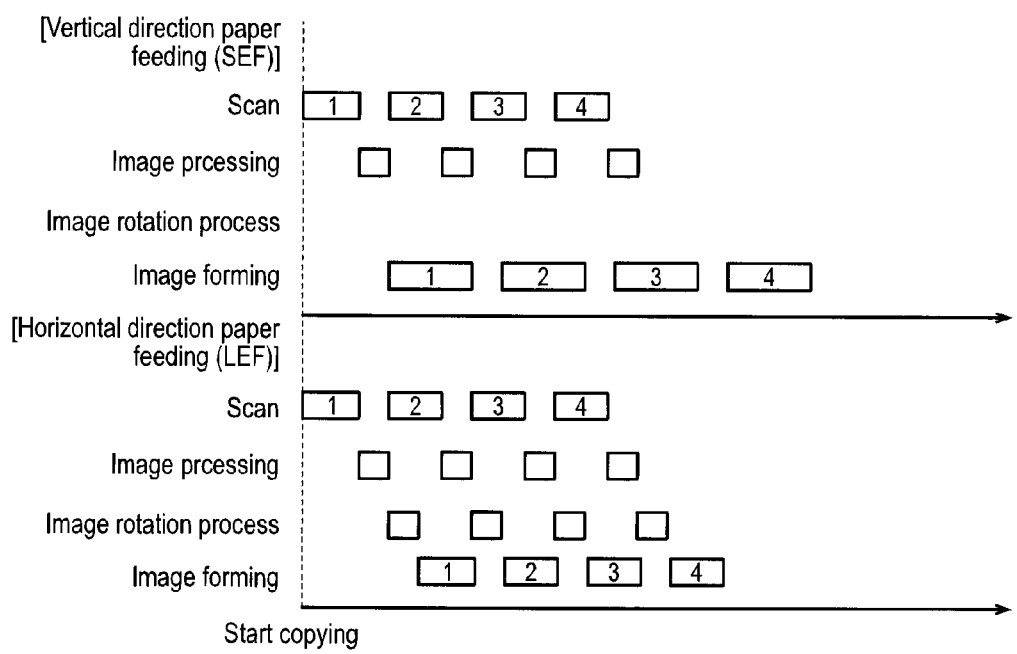
FIG. 10 is a diagram showing the time required for copying processes by SEF and the time required for copying processes by LEF, in the event four documents are printed in one copy each at enlarging magnification.

FIG. 10 is a diagram showing the time required for copying processes by SEF and the time required for copying processes by LEF, in the event four documents are printed in one copy each at enlarging magnification.

In the event an image is enlarged, only part of an image of a document is read, and the range of image reading therefore becomes narrow. However, since the reading resolution needs to be increased, the speed of reading becomes slow. Note that the reading speed is changed by, for example, switching the transport speed of paper by the ADF. Consequently, the time required for the reading process may become shorter or longer than when 1×-magnification copying is performed, depending on the rate of magnification. Also, since it is necessary to apply image processing to image data, it is not possible to start the image forming process before the document reading process is complete.

In FIG. 10, the time required for copying processes becomes shorter by LEF than by SEF. Consequently, in the copying processes of the present embodiment, LEF is selected, and the image forming process is performed on paper that is fed by LEF.

As described above, according to the present embodiment, when copying processes to feed a document by SEF are executed, between SEF and LEF, the one direction that makes the time required for the copying processes shorter is selected as the feeding direction of paper on which an image is going to be formed. Then, copying processes are executed in the selected feeding direction. According to this configuration, the time required for copying processes is reduced.

(Variation)

Figure 11:
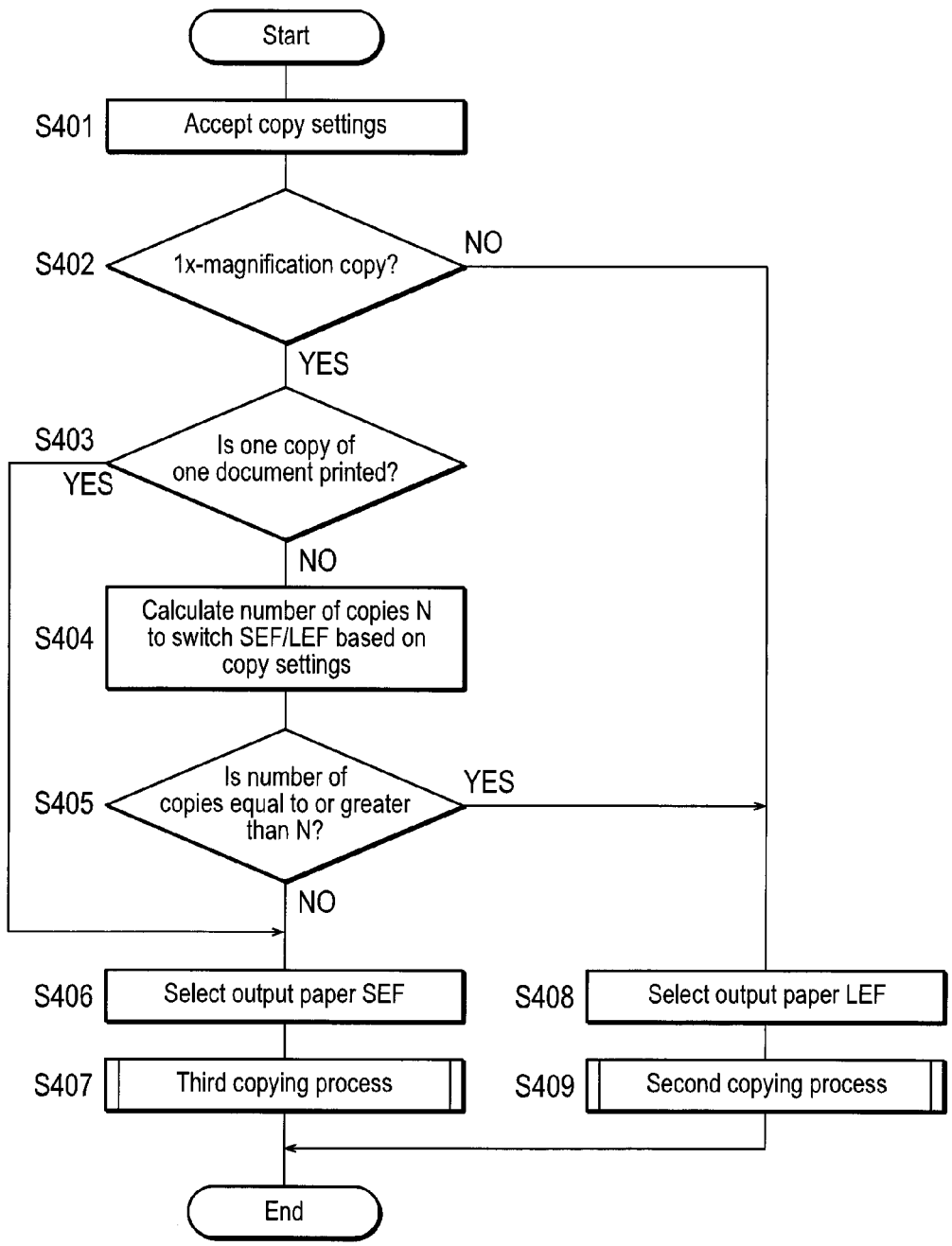
FIG. 11 is a flowchart showing a variation of a copying process executed by an MFP.

FIG. 11 is a flowchart showing a variation of a copying process executed by an MFP.

First, the copy settings are accepted (step S401). Next, whether or not 1×-magnification copying is performed is determined (step S402).

When it is determined that 1×-magnification copying is not performed (step S402: NO), LEF is selected (step S408). In the present embodiment, it is not possible to start the image forming process before the document reading process is complete, and, provided that the time required for copying processes becomes shorter by feeding paper by LEF and performing the image forming process, LEF is selected.

On the other hand, in the event 1×-magnification copying is determined to be performed in the process illustrated in step S402 (step S402: YES), whether or not one copy of one document is printed is determined (step S403). In the present embodiment, whether or not the number of documents is one and the number of copies set by the user is one, is determined.

When it is determined that one copy of one document is printed (step S403: YES), SEF is selected (step S406). In the present embodiment, in the event one copy of one document is printed, it is possible to start the image forming process before the document reading process is complete, and complete the image forming process nearly at the same time the reading process is complete, so that SEF is selected.

On the other hand, when it is determined that one copy of one document is not printed in the process illustrated in step S403 (step S403: NO), the number of copies N, which serves as the basis for switching between SEF and LEF, is calculated based on the copy settings (step S404). In the present embodiment, based on the copy settings and the number of documents accepted in the process illustrated in step S401, a number of copies N to reverse the time required for copying processes by SEF and the time required for copying processes by LEF is calculated.

Then, whether or not the number of copies set by the user is equal to or greater than N is determined (step S405). In the present embodiment, whether or not the number of copies accepted in the process illustrated in step S401 is equal to or greater than the number of copies N calculated in the process illustrated in step S404 is determined.

In the event the number of copies is determined to be less than N (step S405: NO), SEF is selected (step S406). Then, a third copying process is executed (step S407), and the process is finished.

Figure 12:
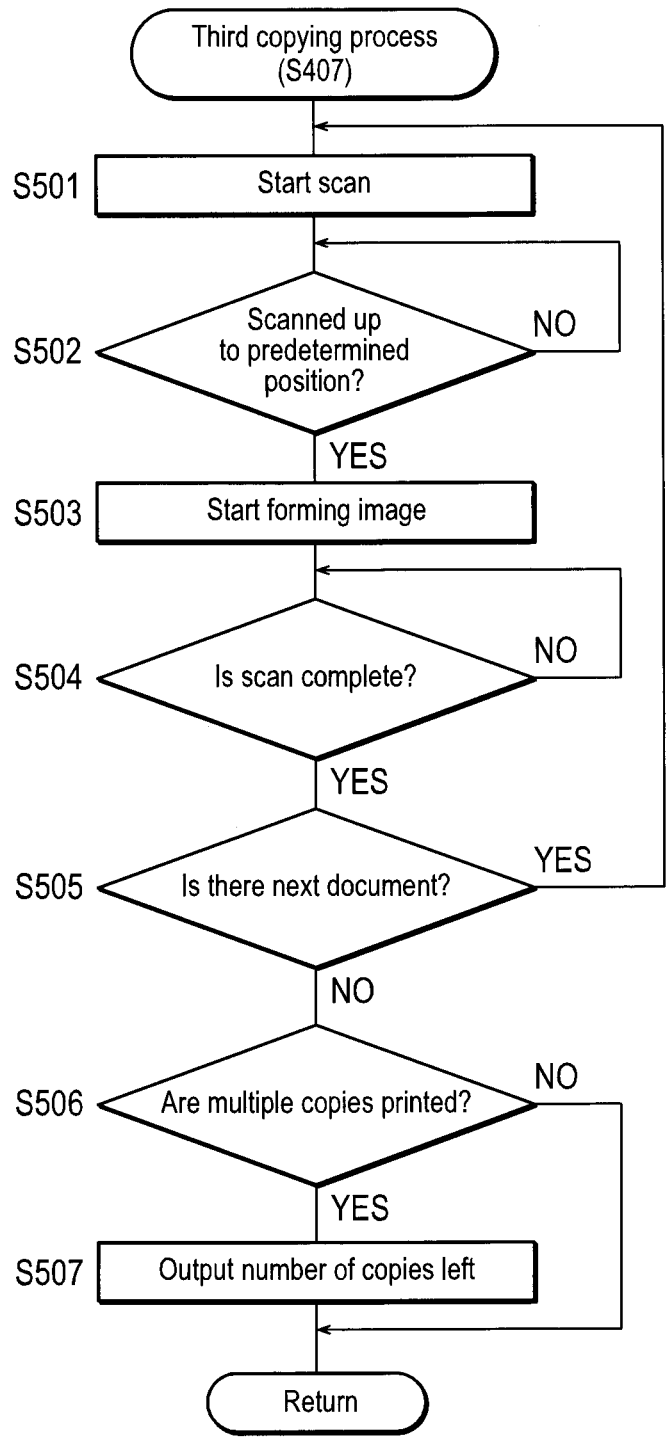
FIG. 12 is a flowchart illustrating the steps of the third copying process shown in step S407 in FIG. 11.

FIG. 12 is a flowchart illustrating the steps of the third copying process illustrated in step S407 in FIG. 11. The processes illustrated in steps S501 to S507 in FIG. 12 are the same as the processes illustrated in step S202 to S208 in FIG. 4, and therefore detailed explanation of the third copying process will be omitted. By executing the third copying process, an image of a document that is fed by SEF is read and meanwhile an image is formed on paper that is fed by SEF.

On the other hand, in the event the number of copies is determined to be equal to or greater than N in the process illustrated in step S405 (step S405: YES), LEF is selected (step S408). Then, the second copying process is executed (step S409), and the process is finished. The second copying process is the same as the process in the flowchart illustrated in FIG. 5, and therefore its explanation will be omitted. By executing the second copying process, an image of a document that is fed by SEF is read, and, after an enlargement/reduction process and rotation process of the image are executed, an image is formed on paper that is fed by LEF.

The present invention is by no means limited to the embodiment described above and can be modified in various ways within the scope of claims.

For example, a case has been described with the above embodiment where the present invention is applied to an MFP. However, the present invention may be applied to a copier as well.

The units and methods to perform various processes in the copy machine according to the present embodiment may be implemented by either dedicated hardware circuits or a programmed computer. The above program may be provided by means of, for example, a computer readable recording medium such as a flexible disk or CD-ROM, or may be provided online via a network such as the Internet. In this case, the program that is recorded in the computer readable recording medium is transferred to a memory unit such as a hard disk and stored therein. Also, the above program may be provided as single application software or may be incorporated as one function of a copy machine in the software of this machine.

What is claimed is:

1. A copy machine comprising:
a reading unit that reads an image of a document such that a long-side direction of the document is in line with a reading sub-scan direction and a short-side direction is in line with a reading main scan direction;
a rotation unit that rotates image data acquired by reading the image of the document by said reading unit;
an operation panel unit that accepts copy settings from a user;
an image forming unit that forms the image on paper based on image data acquired by reading the image of the document by said reading unit or based on the image data rotated by said rotation unit, such that a transport direction of the paper is in line with a writing sub-scan direction and a direction orthogonal to said writing sub-scan direction is in line with a writing main scan direction;
a processor, wherein said processor calculates, in a case when the paper is fed to said image forming unit in a first direction in which a long-side direction of the paper matches said writing sub-scan direction, a first time required for a first copying process, which contains the time required for a reading process of the document and the time required for an image forming process on the paper that is fed in said first direction, based on the accepted copy settings after the operation panel unit accept the copy settings of the user; and
wherein the processor calculates, in a case when the paper is fed to said image forming unit in a second direction in which a short-side direction of the paper matches said writing sub-scan direction, a second time required for a second copying process, which contains the time required for the reading process, the time required for a rotation process of the image data, and the time required for an image forming process on the paper that is fed in said second direction, based on the accepted copy settings;

wherein the processor determines whether the first time required for the first copying process is shorter than the second time required for the second copying process; and wherein the processor makes said image forming unit perform the image forming process, without making said rotation unit perform the rotation process, when said first time is determined to be shorter than the second time, and makes said rotation unit perform the rotation process and then makes said image forming unit perform the image forming process when said first time is determined to be not shorter than the second time.

2. The copy machine as claimed in claim 1, further comprising a reduction unit that reduces the image data, wherein
said processor calculates the first time required for the first copying process and the second time required for the second copying process with further considering the time required for a reduction process of the image data; and when the reduction process is performed, after the reading process for one document is complete, said processor performs control to make said reduction unit perform the reduction process with respect to said document.

3. The copy machine as claimed in claim 1, further comprising an enlargement unit that enlarges the image data, wherein
said processor calculates the first time required for the first copying process and the second time required for the second copying process with further considering the time required for an enlargement process of the image data; and when the enlargement process is performed, said processor performs control to make said reading unit read part of the image of the document, and, after the reading process of the part of said image is complete, make said enlargement unit perform the enlargement process.

4. The copy machine as claimed in claim 1, wherein
said reading unit is configured to be able to select first mode to perform the reading process at first reading speed and second mode to perform the reading process of higher resolution than said first mode at second reading speed that is slower than said first reading speed; and the time required for the reading process varies when said first mode is selected and when said second mode is selected.

5. The copy machine as claimed in claim 1, wherein the time required for the reading process of one document by said reading unit is longer than the time required for the image forming process with respect to said one document by said image forming unit.

6. A non-transitory computer readable recording medium stored with a control program for controlling a copy machine comprising: a reading unit that reads an image of a document such that a long-side direction of the document is in line with a reading sub-scan direction and a short-side direction is in line with a reading main scan direction; a rotation unit that rotates image data acquired by reading the image of the document by said reading unit; an operation panel unit that accepts copy settings from a user; and an image forming unit that forms the image on paper based on image data acquired by reading the image of the document by said reading unit or based on the image data rotated by said rotation unit, such that a transport direction of the paper is in line with a writing sub-scan direction and a direction orthogonal to said writing sub-scan direction is in line with a writing main scan direction, said program causing said copy machine to execute a process comprising:

calculating, in a case when the paper is fed to said image forming unit in a first direction in which a long-side direction of the paper matches said writing sub-scan direction, a first time required for a first copying process, which contains, the time required for a reading process of the document and the time required for an image forming process on the paper that is fed in said first direction, based on the accepted copy settings after the operation panel unit accept the copy settings of the user;

calculating, in a case when the paper is fed to said image forming unit in a second direction in which a short-side direction of the paper matches said writing sub-scan direction, a second time required for a second copying process, which contains the time required for the reading process, the time required for a rotation process of the image data, and the time required for an image forming process on the paper that is fed in said second direction, based on the accepted copy settings;

determining whether the first time required for the first copying process is shorter than the second time required for the second copying process;

making said image forming unit perform the image forming process, without making said rotation unit perform the rotation process, when the first time is determined to be shorter than the second time; and making said rotation unit perform the rotation process and then making said image forming unit perform the image forming process when the first time is determined to be not shorter than the second time.

7. The non-transitory computer readable recording medium as claimed in claim 6, wherein
said copy machine further comprises a reduction unit that reduces the image data;
wherein the steps of calculating the first time and calculating the second time each further include considering the time required for a reduction process of the image data; and
when the reduction process is performed, after the reading process for one document is complete, said reduction unit is made to perform the reduction process with respect to said document.

8. The non-transitory computer readable recording medium as claimed in claim 6, wherein
said copy machine further comprises an enlargement unit that enlarges the image data;
wherein the steps of calculating the first time and calculating the second time each further include considering the time required for an enlargement process of the image data; and
when the enlargement process is performed, said reading unit is made to read part of the image of the document, and, after the reading process of the part of said image is complete, said enlargement unit is made to perform the enlargement process.

9. The non-transitory computer readable recording medium as claimed in claim 6, wherein
said reading unit is configured to be able to select first mode to perform the reading process at first reading speed and second mode to perform the reading process of higher resolution than said first mode at second reading speed that is slower than said first reading speed; and the time required for the reading process varies when said first mode is selected and when said second mode is selected.

10. The non-transitory computer readable recording medium as claimed in claim 6, wherein the time required for the reading process of one document by said reading unit is longer than the time required for the image forming process with respect to said one document by said image forming unit.

11. The copy machine as claimed in claim 1, wherein
the time required after the reading process is started until the image forming process is started varies depending on whether the paper is fed in the first direction or the paper is fed in the second direction, and
the processor calculates the first time required for the first copying process and the second time required for the second copying process including further considering the time required after the reading process is started until the image forming process is started.

12. The copy machine as claimed in claim 11, wherein
when the paper is fed in the first direction, before the reading process of one document is complete, the image forming process with respect to said document is started, and
when the paper is fed in the second direction, the image rotation process is executed after the reading process of one document is complete and then the image forming process with respect to said document is started.

13. The copy machine as claimed in claim 1, wherein said processor
calculates a calculated number of copies that makes the first time required for the first copying process longer than the second time required for the second copying process;
acquires a user designated number of copies of the document designated by the user;
determines whether the user designated number of copies is greater than the calculated number of copies;
makes the rotation unit perform the rotation process and then makes the image forming unit perform the image forming process when the user designated number of copies is greater than the calculated number of copies; and
makes the image forming unit perform the image forming process, without making the rotation unit perform the rotation process, when the user designated number of copies is not greater than the calculated number of copies.

14. The non-transitory computer readable recording medium as claimed in claim 6, wherein
the time required after the reading process is started until the image forming process is started varies depending on whether the paper is fed in the first direction or the paper is fed in the second direction, and
the steps of calculating the first time required for the first copying process and the second time required for the second copying process each further include considering the time required after the reading process is started until the image forming process is started.

15. The non-transitory computer readable recording medium as claimed in claim 14, wherein
when the paper is fed in the first direction, before the reading process of one document is complete, the image forming process with respect to said document is started, and
when the paper is fed in the second direction, the image rotation process is executed after the reading process of one document is complete and then the image forming process with respect to said document is started.

16. The non-transitory computer readable recording medium as claimed in claim 6, wherein the process further comprises:
calculating a calculated number of copies that makes the first time required for the first copying process longer than the second time required for the second copying process;
acquiring a user designated number of copies of the document designated by the user; and
determining whether the user designated number of copies is greater than the calculated number of copies, and
wherein the steps of making include making the rotation unit perform the rotation process and then making the image forming unit perform the image forming process when the user designated number of copies is greater than the calculated number of copies, and making the image forming unit perform the image forming process, without making the rotation unit perform the rotation process, when the user designated number of copies is not greater than the calculated number of copies.

17. A method for controlling a copy machine, wherein the copy machine comprises: a reading unit that reads an image of a document such that a long-side direction of the document is in line with a reading sub-scan direction and a short-side direction is in line with a reading main scan direction; a rotation unit that rotates image data acquired by reading the image of the document by said reading unit; an operation panel unit that accepts copy settings from a user;
and an image forming unit that forms the image on paper based on image data acquired by reading the image of the document by said reading unit or based on the image data rotated by said rotation unit, such that a transport direction of the paper is in line with a writing sub-scan direction and a direction orthogonal to said writing sub-scan direction is in line with a writing main scan direction, said method comprising:
calculating, in a case when the paper is fed to said image forming unit in a first direction in which a long-side direction of the paper matches said writing sub-scan direction, a first time required for a first copying process, which contains the time required for a reading process of the document and the time required for an image forming process on the paper that is fed in said first direction, based on the accepted copy settings after the operation panel unit accept the copy settings of the user;
calculating, in a case when the paper is fed to said image forming unit in a second direction in which a short-side direction of the paper matches said writing sub-scan direction, a second time required for a second copying process, which contains the time required for the reading process, the time required for a rotation process of the image data, and the time required for an image forming process on the paper that is fed in said second direction, based on the accepted copy settings;
determining whether the first time required for the first copying process is shorter than the second time required for the second copying process;
making said image forming unit perform the image forming process, without making said rotation unit perform the rotation process, when the first time is determined to be shorter than the second time; and
making said rotation unit perform the rotation process and then making said image forming unit perform the image forming process when the first time is determined to be not shorter than the second time.

18. The method as claimed in claim 17, wherein
said copy machine further comprises a reduction unit that reduces the image data;
wherein the steps of calculating that first time and the second time each further include considering the time required for a reduction process of the image data; and
when the reduction process is performed, after the reading process for one document is complete, said reduction unit is made to perform the reduction process with respect to said document.

19. The method as claimed in claim 17, wherein
said copy machine further comprises an enlargement unit that enlarges the image data;
wherein the steps of calculating that first time and the second time each further include considering the time required for an enlargement process of the image data; and
when the enlargement process is performed, said reading unit is made to read part of the image of the document, and, after the reading process of the part of said image is complete, said enlargement unit is made to perform the enlargement process.

20. The method as claimed in claim 17, wherein
said reading unit is configured to be able to select first mode to perform the reading process at first reading speed and second mode to perform the reading process of higher resolution than said first mode at second reading speed that is slower than said first reading speed; and
the time required for the reading process varies when said first mode is selected and when said second mode is selected.

21. The method as claimed in claim 17, wherein the time required for the reading process of one document by said reading unit is longer than the time required for the image forming process with respect to said one document by said image forming unit.

* * * * *